(12) United States Patent
Bao et al.

(10) Patent No.: US 8,380,495 B2
(45) Date of Patent: Feb. 19, 2013

(54) TRANSCODING METHOD, TRANSCODING DEVICE AND COMMUNICATION APPARATUS USED BETWEEN DISCONTINUOUS TRANSMISSION

(75) Inventors: Changchun Bao, Beijing (CN); Hao Xu, Beijing (CN); Fanrong Tang, Shenzhen (CN); Xiangyu Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 380 days.

(21) Appl. No.: 12/691,283

(22) Filed: Jan. 21, 2010

(65) Prior Publication Data

US 2010/0185440 A1 Jul. 22, 2010

(30) Foreign Application Priority Data

Jan. 21, 2009 (CN) .......................... 2009 1 0009647

(51) Int. Cl.
 *G10L 19/00* (2006.01)
(52) U.S. Cl. ........ 704/201; 704/503; 704/215; 704/203; 704/212; 455/563; 370/342
(58) Field of Classification Search .................. 704/201, 704/203, 214, 500–504, 215, 219, 212; 455/563; 370/342
See application file for complete search history.

(56) References Cited

U.S. PATENT DOCUMENTS

| 5,991,716 A * | 11/1999 | Lehtimaki ..................... 704/212 |
| 6,721,712 B1 * | 4/2004 | Benyassine et al. .......... 704/503 |
| 7,016,834 B1 | 3/2006 | Lakaniemi |
| 2002/0101844 A1 | 8/2002 | El-Maleh et al. |
| 2003/0065508 A1 * | 4/2003 | Tsuchinaga et al. .......... 704/215 |
| 2004/0110539 A1 | 6/2004 | El-Maleh et al. |
| 2006/0100859 A1 * | 5/2006 | Jelinek et al. ................. 704/201 |
| 2010/0223053 A1 * | 9/2010 | Sandgren et al. ............. 704/219 |

FOREIGN PATENT DOCUMENTS

| CN | 1185262 A | 6/1998 |
| CN | 1364287 A | 8/2002 |

(Continued)

OTHER PUBLICATIONS

Office Action issued in corresponding Chinese Patent Application No. 200910009647.X, mailed Oct. 27, 2011.

(Continued)

*Primary Examiner* — Vijay B Chawan
(74) *Attorney, Agent, or Firm* — Brinks Hofer Gilson & Lione

(57) ABSTRACT

The embodiments of a transcoding method, a transcoding device, and a communication apparatus are provided. The embodiment of a method includes: receiving a bit stream input from a sending end; determining an attribute of discontinuous transmission (DTX) used by a receiving end and a frame type of the input bit stream; and transcoding the input bit stream in a corresponding processing manner according to a determination result. Thereby, a corresponding transcoding operation is performed on the input bit stream according to the attribute of DTX used by the receiving end and the frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech.

8 Claims, 9 Drawing Sheets

FOREIGN PATENT DOCUMENTS

| | | |
|---|---|---|
| CN | 1514998 A | 7/2004 |
| CN | 1723724 A | 1/2006 |
| CN | 101783142 B | 8/2012 |
| EP | 1 533 790 A1 | 5/2005 |
| WO | WO 9632823 A1 | 10/1996 |

OTHER PUBLICATIONS

Extended European Search Report issued in corresponding European Patent Application No. 10000604.8, mailed Apr. 23, 2010.

"Annex B: a Silence Compression Scheme for G.729 optimized for terminals conforming to Recommendation V.70", International Telecommunication Union, Series G: Transmission Systems and Media. Nov. 1996.

"Annex A: Coding of Speech at 8kbit/s Using Conjugate Structure Algebraic-Code-Excited Linear-Prediction (CS-ACELP)", International Telecommunication Union, Series G: Transmission Systems and Media. Nov. 1996.

"Coding of Speech at 8kbit/s Using Conjugate-Structure Algebraic-Code-Excited Linear-Prediction (CS-ACELP)", International Telecommunication Union, General Aspects of Digital Transmission Systems. Mar. 1996.

Office Action issued in corresponding European Patent Application No. 10000604.8, mailed Feb. 2, 2012.

* cited by examiner

TRANSCODING METHOD, TRANSCODING DEVICE AND COMMUNICATION APPARATUS USED BETWEEN DISCONTINUOUS TRANSMISSION

CROSS-REFERENCE TO RELATED APPLICATION

This application claims priority to Chinese Patent Application No. 200910009647.X, filed on Jan. 21, 2009, which is hereby incorporated by reference in its entirety.

FIELD

The present disclosure relates to the field of network communication technology, and more particularly to a transcoding method and a transcoding device.

BACKGROUND

Speech coding based on code-excited linear prediction (CELP) is one of the core technologies used in current voice over Internet protocol (VoIP) applications and mobile communication systems. In order to achieve compatibility and interoperability between communication apparatuses from different suppliers, transcoding needs to be performed between different CELP speech coding standards.

At present, methods for solving the problem include decode then encode (DTE). In the DTE method, a decoder at a sending end decodes a transmitted bit stream and restores a reconstructed speech, and an encoder at a receiving end encodes the reconstructed speech to generate a bit stream decodable by a decoder at the receiving end and then transfers the bit stream to the receiving end. During the process of implementing the disclosure, the inventor found that the DTE method in the prior art is disadvantageous in that the quality of the synthesized speech is decreased, and the computational complexity and overall delay are increased.

For discontinuous transmission (DTX) transcoding algorithms, during the process of implementing the present disclosure, the inventor found that the DTX transcoding algorithms in the prior art is disadvantageous in that a synthesized speech needs to be restored in a media gateway or a base station, and at a target end, all non-speech parameters need to be calculated using the DTE method, and as a result, the computational complexity and overall delay of the transcoding operation as well as the cost are increased, and the efficiency is decreased.

In addition, existing DTX transcoding algorithms can only provide technical solutions for a situation where both the sending end and the target end turn on DTX. But they are not applicable when only the sending end or the target end turns on DTX or it is unknown whether the sending end turns on DTX or not. When the sending end does not turn on DTX and the target end turns on DTX, type information of each frame from a source bit stream indicates a speech frame type, and type information of a target frame cannot be determined. When the sending end turns on DTX and the target end does not turn on DTX, the target frame type does not need to be determined. At this time, the type information of the target frames indicates a speech frame type. Methods for transcoding a silence insertion descriptor (SID) frame or a NO_DATA frame into a speech frame cannot be known.

SUMMARY

Accordingly, the present disclosure is directed to a transcoding method, a transcoding device, and a communication apparatus, so as to perform a corresponding transcoding operation on an input bit stream according to an attribute of discontinuous transmission (DTX) used by a receiving end and a frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech.

In order to achieve the above objectives, in an embodiment, the present disclosure provides a transcoding method, which includes: receiving a bit stream input from a sending end; determining an attribute of DTX used by a receiving end and a frame type of the input bit stream; and transcoding the input bit stream in a corresponding processing manner according to a determination result.

In order to achieve the above objectives, in an embodiment, the present disclosure provides a transcoding device, which includes a receiving unit, a determination unit, and a first processing unit.

The receiving unit is configured to receive a bit stream input from a sending end.

The determination unit is configured to determine an attribute of DTX used by a receiving end and a frame type of the input bit stream.

The first processing unit is configured to transcode the input bit stream in a corresponding processing manner according to a determination result.

In order to achieve the above objectives, in an embodiment, the present disclosure provides a communication apparatus, which includes a transcoding device.

The beneficial effects of the present disclosure are as follows. In the present disclosure, a corresponding transcoding operation is performed on the input bit stream according to the attribute of DTX used by the receiving end and the frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech.

BRIEF DESCRIPTION OF THE DRAWINGS

The accompanying drawings are included to provide a further understanding of the disclosure, and constitute a part of this specification, but are not intended to limit the present disclosure, and wherein.

DETAILED DESCRIPTION OF THE EMBODIMENTS

In order to make the objectives, technical solutions, and advantages of the present disclosure more comprehensible, the present disclosure is further described in detail below with reference to the accompanying drawings. Here, exemplary embodiments of the present disclosure and illustration thereof are used to explain the present disclosure, but not intended to limit the present disclosure.

First Embodiment

Figure 1:
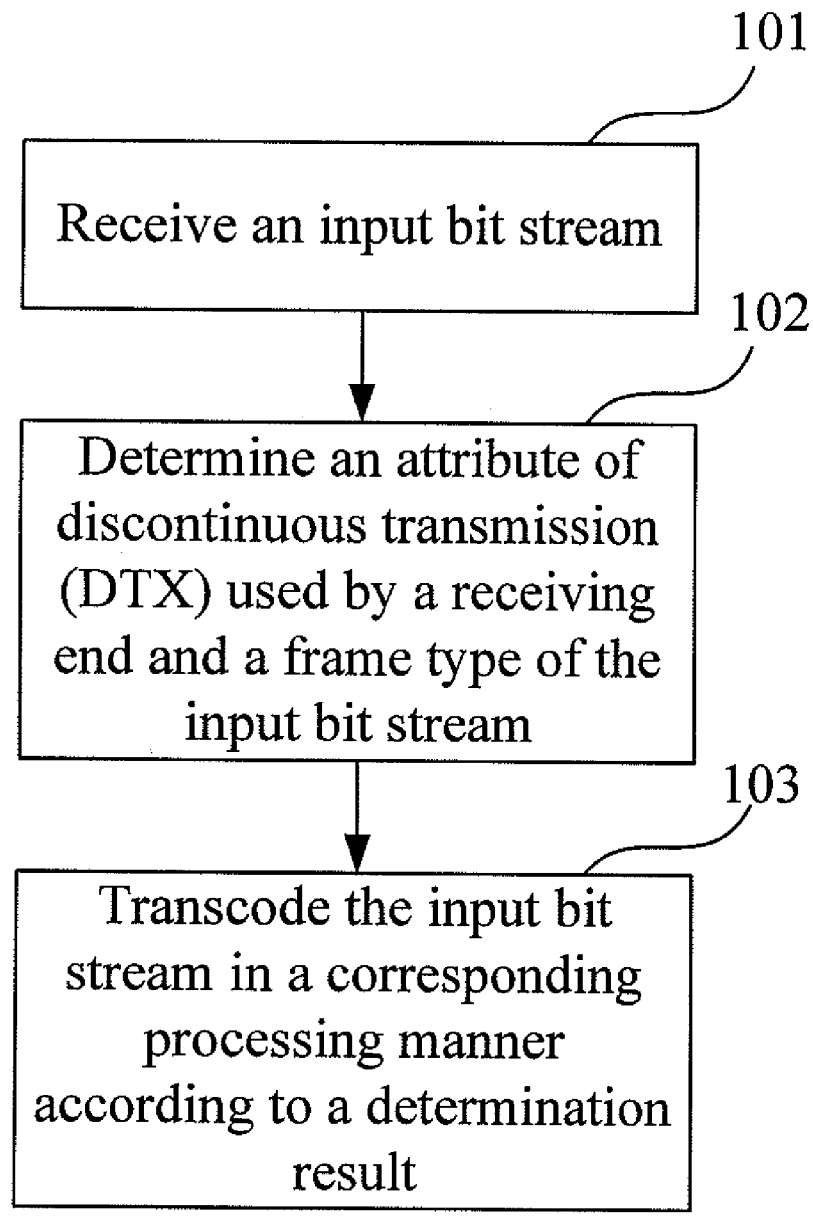
FIG. 1 is a flow chart of a transcoding method according to a first embodiment of the present disclosure.

The embodiment of the present disclosure provides a transcoding method. As shown in FIG. 1, the method includes: receiving a bit stream input from a sending end (Step 101); determining an attribute of discontinuous transmission (DTX) used by a receiving end and a frame type of the input bit stream (Step 102); and transcoding the input bit stream in a corresponding processing manner according to a determination result (Step 103).

In this embodiment of the present disclosure, the determining of the attribute of DTX used by the receiving end (that is, determining whether the receiving end uses DTX or not) and the frame type of the input bit stream in Step 102 may obtain the following results: the receiving end uses DTX and the frame type of the input bit stream is a speech frame or a non-speech frame; and the receiving end does not use DTX and the frame type of the input bit stream is a speech frame or a non-speech frame. In such a manner, input bit streams of various types can be processed, and the input bit streams can be correspondingly transcoded according to the requirements of the receiving end. Moreover, the method is applicable whether the sending end uses DTX or not.

As can be seen from the embodiment, in the method, a corresponding transcoding operation is performed on the input bit stream according to the attribute of DTX used by the receiving end and the frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech.

Second Embodiment

In this embodiment, the present disclosure provides a transcoding method. The steps of the method are as shown in FIG. 1.

In Step 102, the attribute of DTX used by the receiving end and the frame type of the input bit stream may be determined in the following manner.

Firstly, it may be determined whether the receiving end uses DTX or not according to pre-configured parameters. For example, it is determined whether the receiving end uses DTX or not according to the on/off state of DTX, that is, DTX_ON or DTX_OFF.

Then, the frame type of the input bit stream may be obtained by decoding the frame type of the input bit stream. The frame type includes a speech frame and a non-speech frame. The non-speech frame may include a NO_DATA frame and a silence insertion descriptor (SID) frame. A frame type of the current frame may be determined according to a frame type identifier of the current frame. For example, G.729ab uses three frame types (FrameType), which are represented by 0, 1, and 2, respectively. 0 represents that the current frame is a NO_DATA frame, 1 represents that the current frame is an active speech frame, and 2 represents that the current frame is a silence insertion descriptor (SID) frame.

The transcoding of the processed input bit stream in the corresponding processing manner according to the determination result in Step 103 is illustrated in detail below with reference to the accompanying drawings.

In a first situation, the receiving end uses DTX and the frame type of the input bit stream is a speech frame.

A process for transcoding an adaptive multi-rate (AMR) code stream to a G.729ab code stream is illustrated in detail below as an example.

Figure 2:
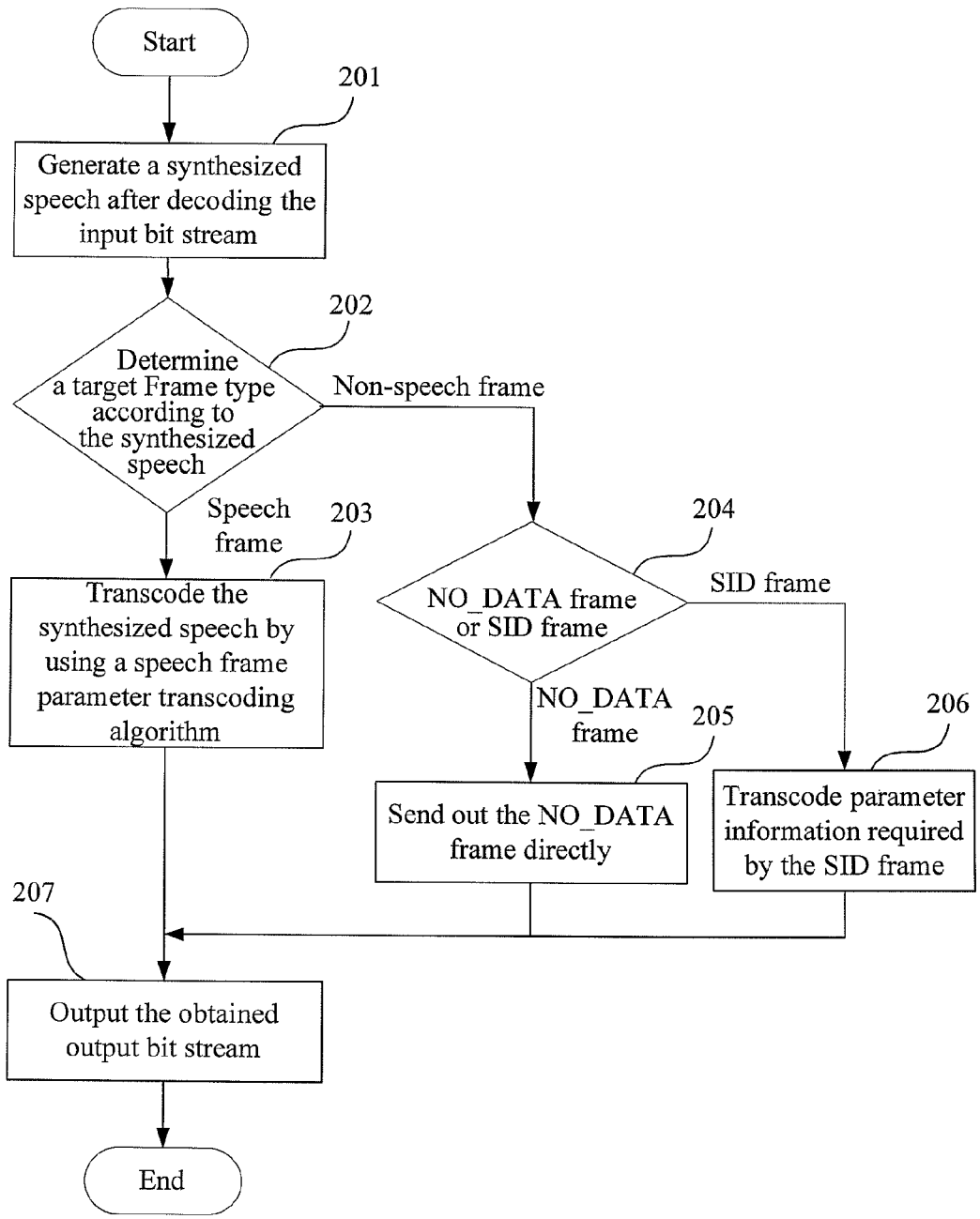
FIG. 2 is a flow chart of Step 103 when a sending end does not use DTX and a receiving end uses DTX according to a second embodiment of the present disclosure.

As shown in FIG. 2, the input bit stream may be transcoded in the following manner.

In Step 201, a synthesized speech is generated from the input bit stream after the input bit stream is decoded.

In this embodiment, the input bit stream may be decoded in a decoding manner corresponding to the sending end, and form a synthesized speech. In such a manner, a voice activity detection (VAD) result of a target frame may be determined according to the synthesized speech. The decoding algorithm and the method for generating the synthesized speech may be any one in the prior art, and the details will not be described herein again.

In Step 202, a target frame type is determined according to the synthesized speech.

In this embodiment, the target frame type may be determined by using an AMR-VAD1 algorithm and a DTX algorithm of the receiving end. For example, the VAD result of the target frame is determined according to the synthesized speech by using a VAD algorithm (AMR-VAD1) in an AMR narrowband (AMR-NB) codec (that is, it is determined whether the target frame is a speech frame or a silence frame), and the target frame type is determined by using the VAD result in combination with the DTX algorithm of the receiving end (for example, in transcoding from AMR to 729, the receiving end is 729). In such a situation, in a transcoding algorithm from AMR to G.729ab, the AMR-VAD1 algorithm is used to replace the G.729 VAD algorithm, which achieves the following effects. (1) The algorithm does not need partial results of the linear predictive coding (LPC) analysis and only needs an input speech, with a computational complexity equivalent to the computational complexity in 729ab. (2) A VAD decision is performed once for 160 input sampling points in the AMR-VAD1 algorithm, and a VAD decision is performed once for 80 input sampling points in the original 729ab. The application of the AMR-VAD1 algorithm may decrease half of the computational complexity of performing the VAD decision. However, the present disclosure is not limited thereto, and other algorithms may also be used to determine the target frame type.

In Step 203, if the target frame type is a speech frame, the synthesized speech is transcoded by using a speech frame parameter transcoding algorithm, so as to obtain an output bit stream. The speech frame parameter transcoding algorithm may be any one in the prior art, and the details will not be described herein again.

In Step 204, if the target frame type is a non-speech frame, it is determined whether the non-speech frame is a NO_DATA frame or an SID frame.

In Step 205, if the non-speech frame is a NO_DATA frame, the frame type of the NO_DATA frame is sent out.

In Step 206, if the non-speech frame is an SID frame, parameter information required by the target frame, that is, the SID frame, is transcoded.

In this embodiment, the parameter information may include a line spectrum pair (LSP) parameter and an energy parameter.

For transcoding the LSP parameter, LSP information in the original bit stream, that is, the input bit stream, is decoded, quantized again by using a quantization method of a target encoder, and then written into the output bit stream.

For transcoding the energy parameter, as different signal fields are measured for energy information quantized by the AMR-NB and the G.729ab, certain conversions need to be performed when the energy parameter is transcoded. The steps are as follows.

1) An excitation signal of each AMR-NB frame obtained by decoding a part of parameters is sent out (as the VAD algorithm of the receiving end needs a synthesized speech, the excitation signal can be obtained).

2) An average gain value $G_{ave}$ of the excitation signals is calculated by taking 80 sampling points as a unit.

$$G_{ave} = \sqrt{\frac{1}{80}\sum_{i=0}^{79} \text{exc\_amr}(i)^2}$$

However, the present disclosure is not limited thereto. Other numbers of sampling points may also be used according to practical requirements.

3) An energy value POWER of an SID frame in 729ab is computed:

$$\text{POWER} = 10 \log_{10}(G_{ave})^2.$$

4) The energy value is quantized by using an energy quantization method of the target end, for example, 729, and then written in the output bit stream.

In Step 207, the obtained output bit stream is output.

As can be seen from the above, the process for transcoding the AMR code stream to the 729 code stream is illustrated in detail as an example. A process for transcoding a G.729ab code stream to an AMR code stream is illustrated below with reference to FIG. 2.

In Step 202, the target frame type may be determined in the following manner: using a VAD algorithm provided in the target encoder, VAD1 or VAD2. The VAD1 and VAD2 algorithms are two VAD decision methods for the AMR. The VAD algorithm is used to determine whether the target frame is a speech frame or not.

Steps 203, 204, and 205 are similar to the above. In Step 206, if the non-speech frame is an SID frame, and the SID frame is an SID_FIRST frame or an SID_UPDATE frame, information of each parameter needs to be transcoded according to the requirements of the SID frame of the receiving end. The following manner may be adopted.

1) It is determined whether HANGOVER control is needed or not according to a DTX mechanism. If yes, a buffer operation needs to be performed to provide corresponding information when the target frame is an SID_FIRST frame. 2) If it is determined that the target frame type is an SID_UPDATE frame, parameter information required by the target frame, that is, the SID frame, needs to be transcoded. The parameter information includes an LSP parameter and an energy parameter.

For transcoding the LSP parameter, LSP information in the original bit stream, that is, the input bit stream, is decoded, quantized again by using a quantization method of a target encoder, and then written into the output bit stream.

For transcoding the energy parameter, as different signal fields are measured for energy information calculated by the AMR-NB and G.729ab, certain conversions need to be performed when the energy parameter is transcoded. As the VAD algorithm of the receiving end needs a synthesized speech, a calculation method for energy parameter of the AMR-NB or G.729ab is adopted when the energy parameter is transcoded.

In a second situation, the receiving end does not use DTX and the frame type of the input bit stream is a non-speech frame.

In such a situation, parameter information required by the target frame may be obtained first, and then encoded by using a parameter encoding algorithm of the receiving end, and written into an output bit stream.

Figure 3:
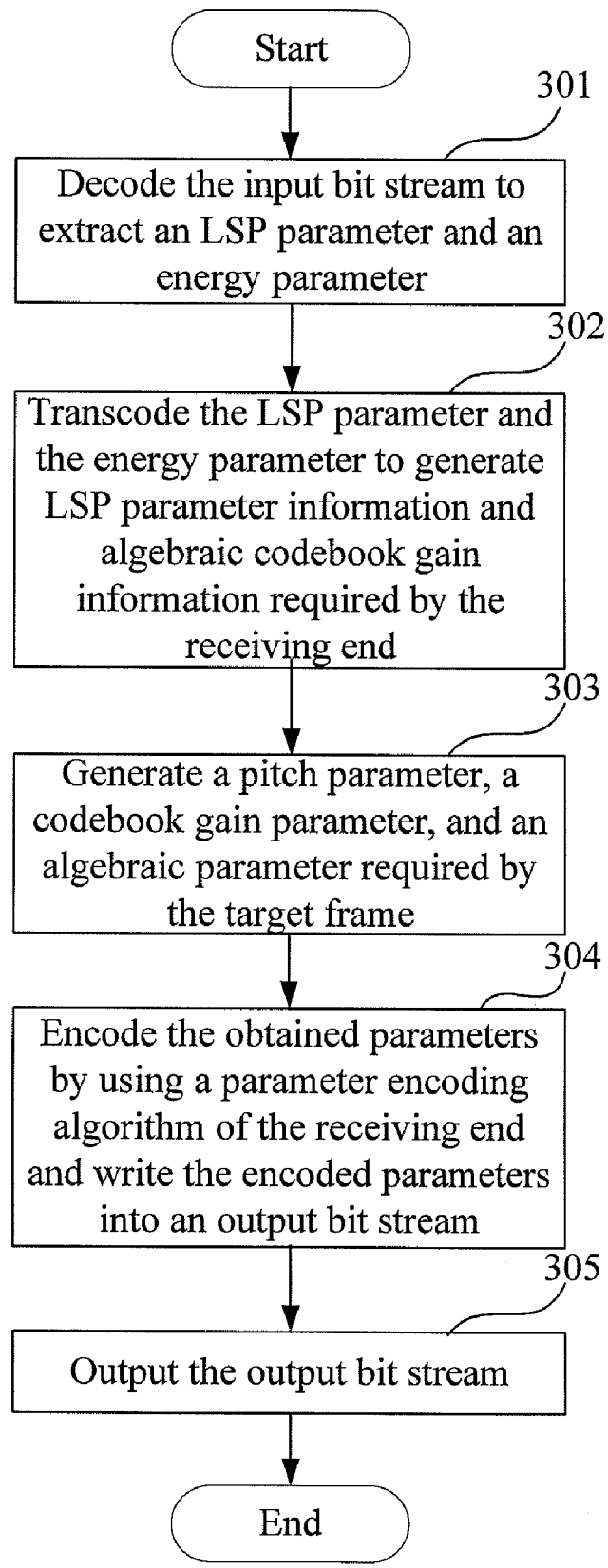
FIG. 3 is a flow chart of Step 103 when the sending end uses DTX and the receiving end does not use DTX according to the second embodiment of the present disclosure.

As shown in FIG. 3, the method includes the following steps.

In Step 301, an LSP parameter and an energy parameter contained in the input non-speech frame are extracted by decoding the input bit stream. In this embodiment, the LSP parameter and the energy parameter contained in the input non-speech frame are extracted by using a DTX decoding algorithm.

In Step 302, the LSP parameter and the energy parameter are transcoded to generate LSP parameter information and algebraic codebook gain information required by the target frame.

In this embodiment, the LSP parameter may be transcoded in the above manner according to practical requirements.

In this embodiment, the energy parameter may be transcoded to the algebraic codebook gain information in the following manner. 1) An excitation signal of each AMR-NB sub frame is obtained by converting the input bit stream into parameters, and then sent out.

2) An average gain value $G_{ave}$ of the excitation signals is calculated by taking 40 sampling points as a unit.

$$G_{ave} = \sqrt{\frac{1}{40}\sum_{i=0}^{39} \text{exc\_amr}(i)^2}$$

However, the present disclosure is not limited thereto. Other numbers of sampling points may also be used for computation according to practical requirements.

3) The average gain value is adjusted in amplitude to obtain a target field algebraic codebook gain $G'_{ave}$.

$$G'_{ave} = 3 \times G_{ave}$$

4) The algebraic codebook gain is quantized by using an algebraic codebook quantization method of the receiving end, and then written into the output bit stream.

In Step 303, a pitch delay generation algorithm, a gain generation algorithm, and an algebraic codebook generation algorithm are respectively used to generate a pitch parameter, a codebook gain parameter, and an algebraic codebook parameter required by the target frame. The pitch delay generation algorithm, the gain generation algorithm, and the algebraic codebook generation algorithm may be any one in the prior art, and the details will not be described herein again.

Step 303 and Step 302 may be performed at the same time.

In Step 304, after all the parameters required by the target speech frame are obtained, the obtained parameters is encoded by using a parameter encoding algorithm of the receiving end, and then written into the output bit stream.

In Step 305, the output bit stream is output.

In a third situation, the receiving end uses DTX and the frame type of the input bit stream is a non-speech frame.

Figure 4:
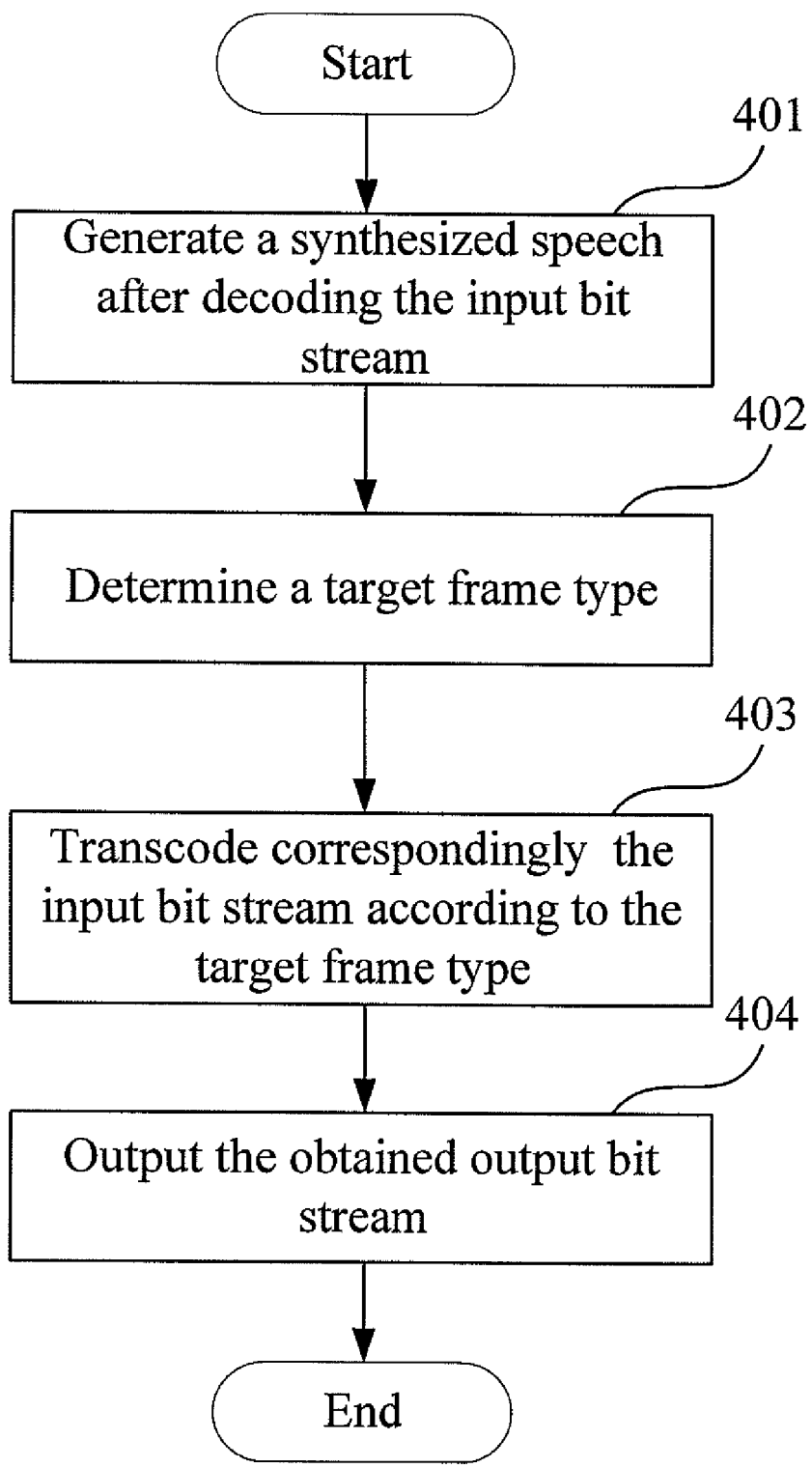
FIG. 4 is a flow chart of Step 103 when the sending end uses DTX and the receiving end uses DTX according to the second embodiment of the present disclosure.

The transcoding method in this situation is illustrated below with reference to FIG. 4.

In Step 401, a synthesized speech is generated by decoding the input bit stream.

In Step 402, a target frame type is determined according to the synthesized speech.

Steps 401 and 402 are similar to Steps 201 and 202 in the first situation, and the details will not be described herein again.

In Step 403, the input bit stream is correspondingly transcoded according to the target frame type.

In Step 404, the obtained output bit stream is output.

In this embodiment, if the target frame is a speech frame, the operation of correspondingly transcoding the input bit stream according to the target frame type in Step 403 can be performed according to the process in the second situation wherein the receiving end does not use DTX and the frame type of the input bit stream is a non-speech frame as shown in FIG. 3, and the details will not be described herein again.

Figure 5:
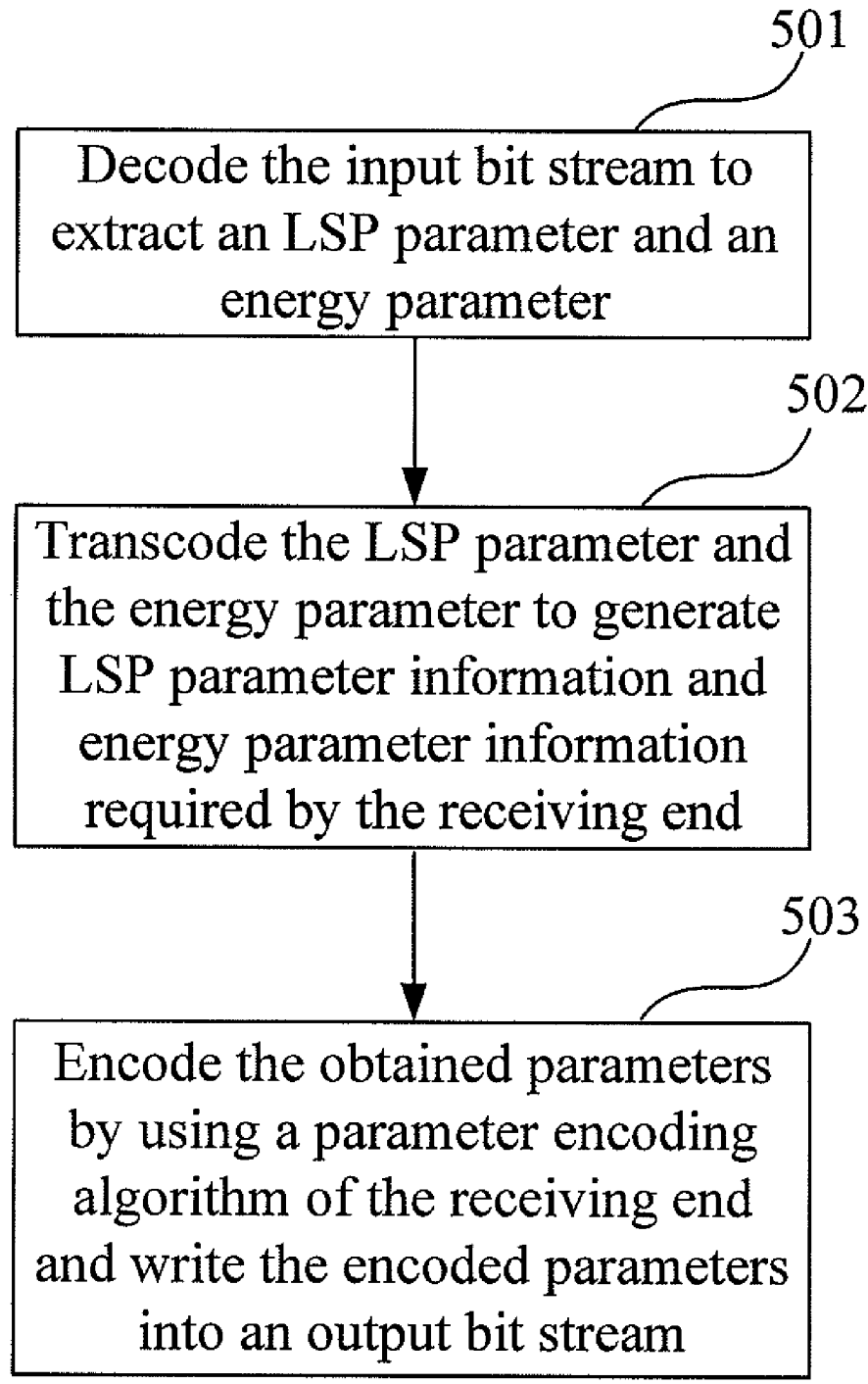
FIG. 5 is a flow chart of Step 403 in FIG. 4 when a target frame is a non-speech frame according to the second embodiment of the present disclosure.

In this embodiment, if the target frame is a non-speech frame, parameter information required by the target frame is obtained, and then encoded by using a parameter encoding algorithm of the receiving end, and written into an output bit stream. As shown in FIG. 5, the method includes the following steps.

In Step 501, an LSP parameter and an energy parameter contained in the input bit stream are extracted by using a DTX decoding algorithm.

In Step 502, LSP parameter information and energy parameter information required by the target frame are obtained by transcoding the LSP parameter and the energy parameter.

In Step 503, the obtained parameter information required by the target frame is encoded by using a parameter encoding algorithm of the receiving end, and then written into an output bit stream.

In a fourth situation, the receiving end does not use DTX and the frame type of the input bit stream is a speech frame.

In this situation, the input bit stream may be transcoded by using a speech frame parameter transcoding algorithm.

As can be seen from the embodiment, in the method, a corresponding transcoding operation is performed on the input bit stream according to four situations with respect to the attribute of DTX used by the receiving end and the frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech.

Third Embodiment

Figure 6:
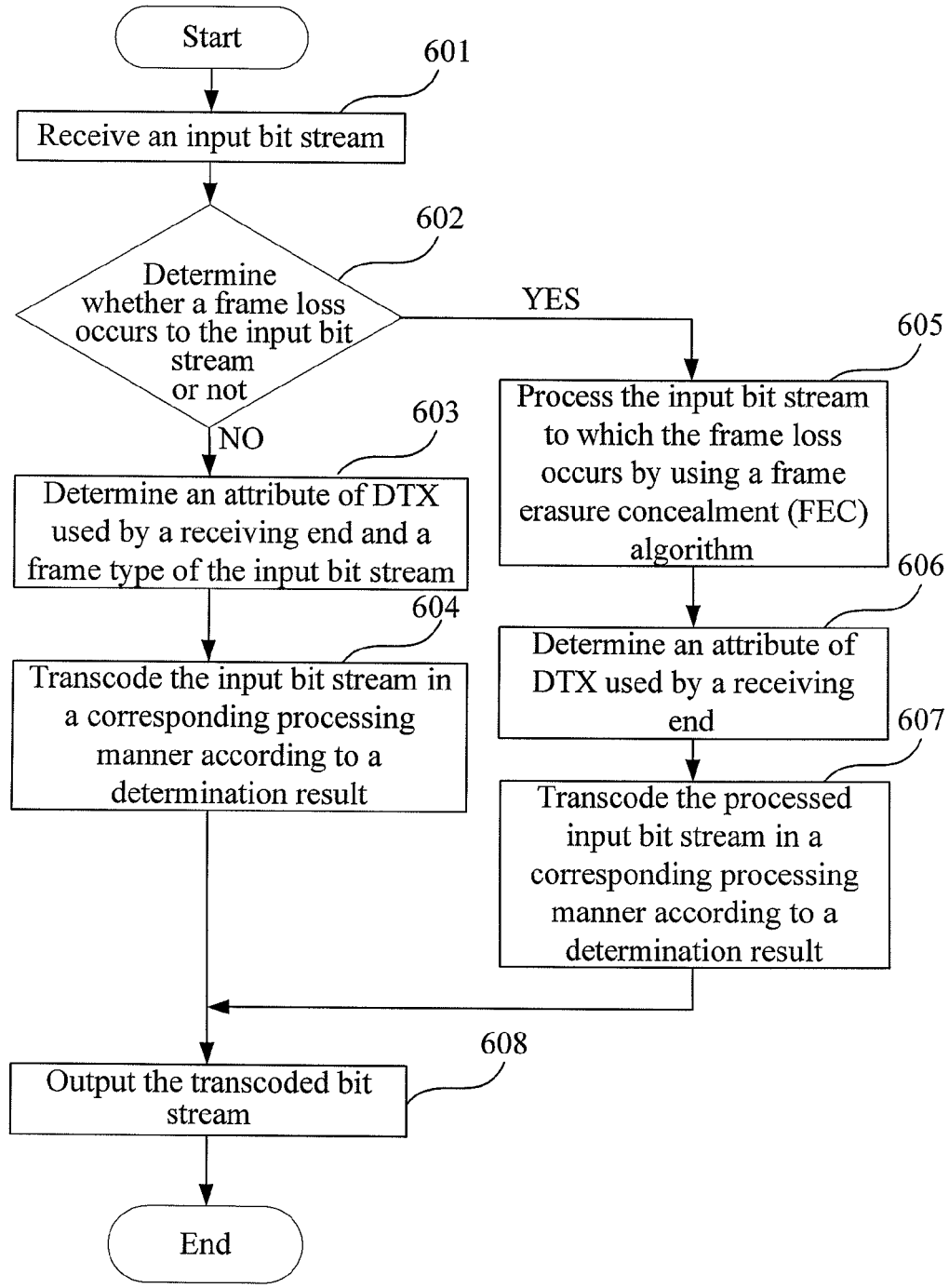
FIG. 6 is a flow chart of a transcoding method according to a third embodiment of the present disclosure.

In this embodiment, the present disclosure provides a transcoding method, which further takes a frame loss into consideration based on the second embodiment. As shown in FIG. 6, the method includes the following steps.

In Step 601, a bit stream input from a sending end is received.

In Step 602, it is determined whether a frame loss occurs to the input bit stream or not.

In Step 603, if it is determined that no frame loss occurs, an attribute of DTX used by a receiving end and a frame type of the input bit stream are determined.

In this embodiment, the attribute of DTX used by the receiving end and the frame type of the input bit stream can be determined in the manner as described in the second embodiment, and the details will not be described herein again.

In Step 604, the input bit stream is transcoded in a corresponding processing manner according to a determination result. In this situation, the transcoding processes for the four situations in the second embodiment can be adopted, and the details will not be described herein again.

In Step 605, if it is determined in Step 602 that the frame loss occurs, the input bit stream to which the frame loss occurs is processed by using a frame erasure concealment (FEC) algorithm.

In Step 606, an attribute of DTX used by a receiving end is determined.

In Step 607, the processed input bit stream is transcoded in a corresponding processing manner according to a determination result. In this embodiment, the determination result indicates whether the receiving end uses DTX or not, as well as the frame type of the input bit stream. The frame type of the bit stream is already determined when the bit stream to which the frame loss occurs is processed by using the FEC algorithm. The transcoding processes for the four situations in the second embodiment can be adopted, and the details will not be described herein again.

The sequence of Steps 605 and 606 is merely an embodiment of the present disclosure, and Step 606 may be performed prior to Step 605.

In Step 608, the transcoded bit stream is output.

Figure 7:
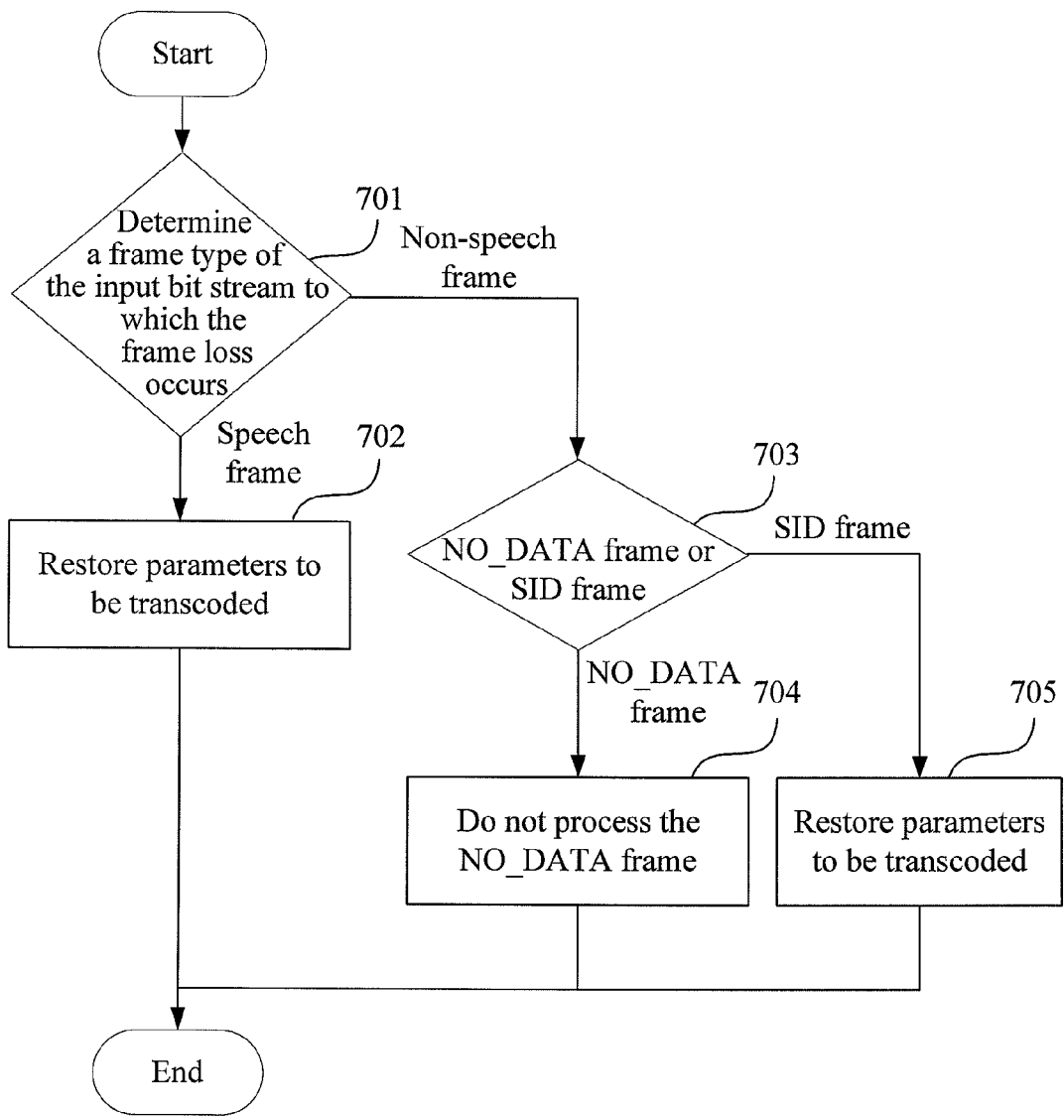
FIG. 7 is a flow chart of a frame erasure concealment (FEC) algorithm according to the third embodiment of the present disclosure.

In this embodiment, the operation of processing the input bit stream to which the frame loss occurs in Step 605 may be performed in the following manner as shown in FIG. 7. Referring to FIG. 7, the process includes the following steps.

In Step 701, a frame type of the input bit stream to which the frame loss occurs is determined.

In this embodiment, a frame type of a current frame may be determined in the following manner. When the current frame is lost, if a previous frame is a speech frame, it is determined that the current frame is a speech frame; and if a previous lost frame is an SID frame or a NO_DATA frame, it is determined that the current frame is an SID frame or a NO_DATA frame. The reason is that the NO_DATA frame does not contain any useful information, so the loss of the NO_DATA frame does not affect the decoding operation. In Step 702, if the frame type of the input bit stream to which the frame loss occurs is a speech frame, parameters to be transcoded are restored.

In Step 703, if the frame type of the input bit stream to which the frame loss occurs is a non-speech frame, it is determined whether the non-speech frame is a NO_DATA frame or an SID frame.

In Step 704, if the non-speech frame is a NO_DATA frame, the input bit stream to which the frame loss occurs is not processed.

In Step 705, if the non-speech frame is an SID frame, parameters to be transcoded are restored.

The operation of restoring the parameters to be transcoded when it is determined that the frame type of the input bit stream to which the frame loss occurs is a speech frame in Step 702 is illustrated below with respect to transcoding an AMR code stream to a 729ab code stream and transcoding a 729ab code stream to an AMR code stream, respectively.

In a first situation, when an AMR code stream is transcoded to a 729ab code stream, the parameters to be restored may include an LSP parameter, a pitch parameter, an algebraic codebook parameter, and a gain parameter. The parameters may be restored in the following manner.

1) Restoration of the LSP Parameter

The LSP parameters lsp_q1 and lsp_q2 of the lost frame are determined according to an LSP parameter past_lsp_q of a previous frame and an LSP parameter mean value mean_lsp, as shown by the following equation.

$$lsp\_q1(i)=lsp\_q2(i)=0.9\times past\_lsp\_q(i)+0.1\times mean\_lsp(i), i=0 \ldots$$

In the above equation, an interpolation factor takes a value of 0.9. In a non-AMR122 mode, only a set of LSP parameters is restored. In an AMR122 mode, two identical sets of LSP parameters are restored. Here, past_lsp_q(i) is a quantized LSP parameter of the previous frame, and mean_lsp(i) is a mean value of LSP parameters. Update of historical states for moving average (MA) prediction is same as that in normal decoding.

2) Restoration of the Pitch Parameter

When a frame loss occurs, pitch information of the previous frame is usually used as a pitch value of the current lost frame. The precision of the pitch value of the current lost frame directly influences the quality of the synthesized speech. Using information of a plurality of frames previous to the lost frame to restore information of the current lost frame is much better than using information of only one frame previous to the lost frame to restore the information of the current lost frame. In this embodiment, a linear prediction method is used to obtain pitch information of the current frame. The prediction model is as follows:

$$\text{Pitch}'(i)=x+y\times i$$

Here, Pitch'(i) (i=0, 1, 2, 3, 4) is a pitch value of a frame previous to the lost frame, and Pitch'(0) is the pitch value of the earliest frame.

Pitch'(5) of the current lost frame may be obtained through the following equation.

$$\text{Pitch}'(5)=x+5y$$

In order to determine coefficients a and b, a minimum mean-square error criterion is adopted to derive values of a and b.

$$E = \sum_{i=0}^{4} [\text{Pitch}'(i) - \text{Pitch}(i)]^2 = \sum_{i=0}^{4} [x + y \times i - \text{Pitch}(i)]^2$$

Provided that $\partial E/\partial x=0$ and $\partial E/\partial y=0$, the following equations are obtained.

$$x = \frac{3\sum_{i=0}^{4}\text{Pitch}(i) - \sum_{i=0}^{4} i \times \text{Pitch}(i)}{5}$$

$$y = \frac{\sum_{i=0}^{4} i \times \text{Pitch}(i) - 2\sum_{i=0}^{4} \text{Pitch}(i)}{10}$$

3) Restoration of the Algebraic Codebook Parameter

The algebraic codebook parameter is randomly generated. In the discussed non-DTX transcoding algorithm, the algebraic codebook parameter only needs to be restored in the AMR795 and AMR74 modes. Two random numbers are generated. The first random number is formed by 13 bits, and divided into 3:3:3:4 bits, which are corresponding to positions of pulses in all channels, respectively. The second random number is formed by 4 bits, which represent symbols of impulses in 4 channels, respectively.

4) Restoration of the Gain Parameter

The gain parameters $g^p$ and $g^c$ are restored according to a transcoding situation of the decoding end by using a method as shown by the following equation.

$$g^p = \begin{cases} P(\text{state}) \times g^p(-1), & g^p(-1) \leq \text{mean\_gp\_past5} \\ P(\text{state}) \times \text{mean\_gp\_past5}, & g^p(-1) > \text{mean\_gp\_past5} \end{cases}$$

Here, mean_gp_past5 represents a mean value of quantized adaptive codebook gains of historical 5 points, state is a state number determined by the decoding end, P(1)=P(2)=0.98, P(3)=0.8, P(4)=0.3, and P(5)=P(6)=0.2. $g^p(-1)$ represents an adaptive codebook gain value of the previous frame obtained after quantization.

$$g^c = \begin{cases} C(\text{state}) \times g^c(-1), & g^c(-1) \leq \text{mean\_gc\_past5} \\ C(\text{state}) \times \text{mean\_gc\_past5}, & g^c(-1) > \text{mean\_gc\_past5} \end{cases}$$

Here, mean_gc_past5 represents a mean value of quantized algebraic codebook gains of historical 5 points, state is a state number determined by the decoding end, C(1)=C(2)=C(3)=C(4)=C(5)=0.98, and C(6)=0.7. $g^c(-1)$ represents an algebraic codebook gain value of the previous frame obtained after quantization.

When the history for MA prediction needs to be updated during the gain parameter quantization, the current history ener(0) is updated by using a mean value of historical residual errors, as shown by the following equation.

$$ener(0) = \frac{1}{4}\sum_{i=1}^{4} ener(-i)$$

In a second situation, when a 729ab code stream is transcoded to an AMR code stream, the parameters to be restored include the following parameters.

1) Restoration of the LSP Parameter

The LSP parameter is replaced by an LSP parameter of a previously received good frame. A state of an MA predictor for the LSP parameter quantization is updated by using the following equation.

$$l_i = \left[w_i^{(m)} - \sum_{k=1}^{4} p_{i,k} l_i^{(m-k)}\right] \bigg/ \left(1 - \sum_{k=1}^{4} p_{i,k}\right) i = 1, \ldots, 10$$

Here, a coefficient $p_{i,k}$ of the MA predictor is replaced by that in a previous good frame.

2) Restoration of the Pitch Parameter

When the pitch parameter is restored, if the current frame is the first bad frame, an integer pitch of a second sub-frame of the previous good frame is used as an integer pitch delay of the current lost frame, and a fractional pitch delay is set to zero. Subsequently, one (1) is added to the integer pitch value of the second sub-frame of the previous good frame, and then the integer pitch value is stored. When consecutive error frames occur, the error frames are replaced by the pitch value which one (1) has been added to. An upper limit of the pitch value is set to 143. However, the present disclosure is not limited thereto.

3) Restoration of the Algebraic Codebook Parameter

When the algebraic codebook parameter is restored, two random numbers are generated. The first random number is formed by 13 bits, and divided into 3:3:3:4 bits, which are corresponding to positions of pulses in all channels, respectively. The second random number is formed by 4 bits, which represent symbols of impulses in 4 channels, respectively.

4) Restoration of the Gain Parameter

For the restoration of the gain parameters $g_c^{(m)}$ and $g_p^{(m)}$, an attenuation value of a gain parameter value of the previous frame is used as a gain parameter of the current frame, as shown by the following equation.

$$g_c^{(m)} = 0.98 g_c^{(m-1)}$$

Here, $g_c$ represents an algebraic codebook gain, m represents a current frame index, and m−1 represents a previous frame index.

$$g_p^{(m)} = 0.98 g_p^{(m-1)}$$

Here, $g_p$ represents an adaptive codebook, m represents a current frame index, and m−1 represents a previous frame index.

When the history for MA prediction needs to be updated during the gain parameter quantization, a mean value of historical residual errors is attenuated, and then used to update the current history, as shown by the following equation.

$$U^{(m)} = \left(0.25 \sum_{i=1}^{4} U^{(m-i)}\right) - 4.0$$

5) Constitution of the Excitation Signal

The excitation signal is constituted by the adaptive codebook obtained after performing interpolation on the pitch delay generated above, and the randomly generated algebraic codebook, which are multiplied by the restored adaptive codebook and algebraic codebook gains, respectively.

As can be seen from the above, after the parameters to be transcoded are restored, the restored input bit stream can be processed by using the process corresponding to the first or fourth situation in the second embodiment. The processes are as described in the second embodiment, and the details will not be described herein again.

In Step 705, if the non-speech frame is an SID frame, the operation of restoring the parameters to be transcoded is illustrated below with respect to a situation wherein an AMR code stream is transcoded to a 729ab code stream and a situation wherein a 729ab code stream is transcoded to an AMR-NB code stream, respectively.

In the first situation, when an AMR code stream is transcoded to a 729ab code stream, the description is given below.

An LSP parameter of a previous SID frame may be used to replace an LSP parameter of the current frame, and an energy parameter of the previous SID frame may be used to replace an energy parameter of the current SID frame.

In the second situation, when a 729ab code stream is transcoded to an AMR-NB code stream, the description is given below.

When the lost frame is an SID frame, the following two situations need to be discussed.

(1) If the lost SID frame is not the first SID frame in a non-speech section, an LSP parameter of a previous SID frame may be used to replace an LSP parameter of the current frame, and an energy parameter of the previous SID frame may be used to replace an energy parameter of the current SID frame.

(2) If the lost SID frame is the first SID frame in a non-speech section, the LSP parameter is replaced by an LSP parameter of a previous good frame, a gain value of excitation signal energy of the previous good frame obtained after SID gain quantization is used as an energy parameter of the current lost SID frame.

As can be seen from the above, after the parameters to be transcoded are replaced, the replaced input bit stream can be processed by using the process corresponding to the second or third situation in the second embodiment. The processes are as described in the second embodiment, and the details will not be described herein again.

As can be seen from the embodiment, in the method, a corresponding transcoding operation is performed on the input bit stream according to the attribute of DTX used by the receiving end and the frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech.

Fourth Embodiment

Figure 8:
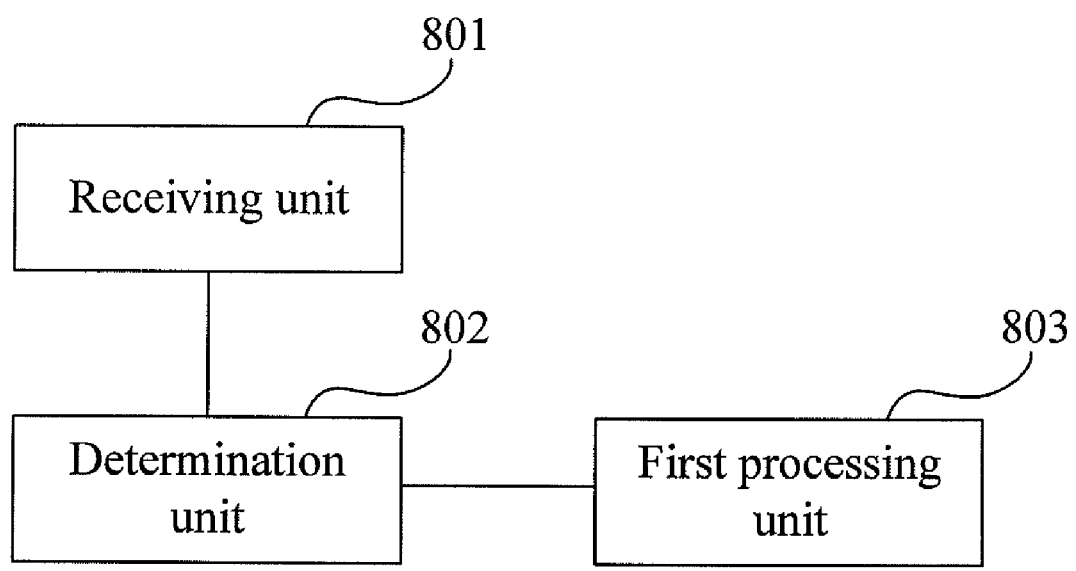
FIG. 8 is a schematic structural view of a transcoding device according to a fourth embodiment of the present disclosure.

In this embodiment, the present disclosure provides a transcoding device. As shown in FIG. 8, the device includes a receiving unit 801, a determination unit 802, and a first processing unit 803. The receiving unit 801 is configured to receive a bit stream input from a sending end. The determination unit 802 is configured to determine an attribute of DTX used by a receiving end and a frame type of the input bit stream. The first processing unit 803 is configured to transcode the input bit stream in a corresponding processing manner according to a determination result.

In this embodiment, methods used by the determination unit 802 to determine whether the receiving end uses DTX or not and determine the frame type of the input bit stream, as well as the determination result are as described in the second and third embodiments, and the details will not be described herein again.

An operational process of the transcoding device is similar to the first embodiment, and the details will not be described herein again.

The device may be used separately or integrated with a base station or a media gateway.

As can be seen from the embodiment, the device can perform a corresponding transcoding operation on the input bit stream according to the attribute of DTX used by the receiving end and the frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech.

Fifth Embodiment

Figure 9:
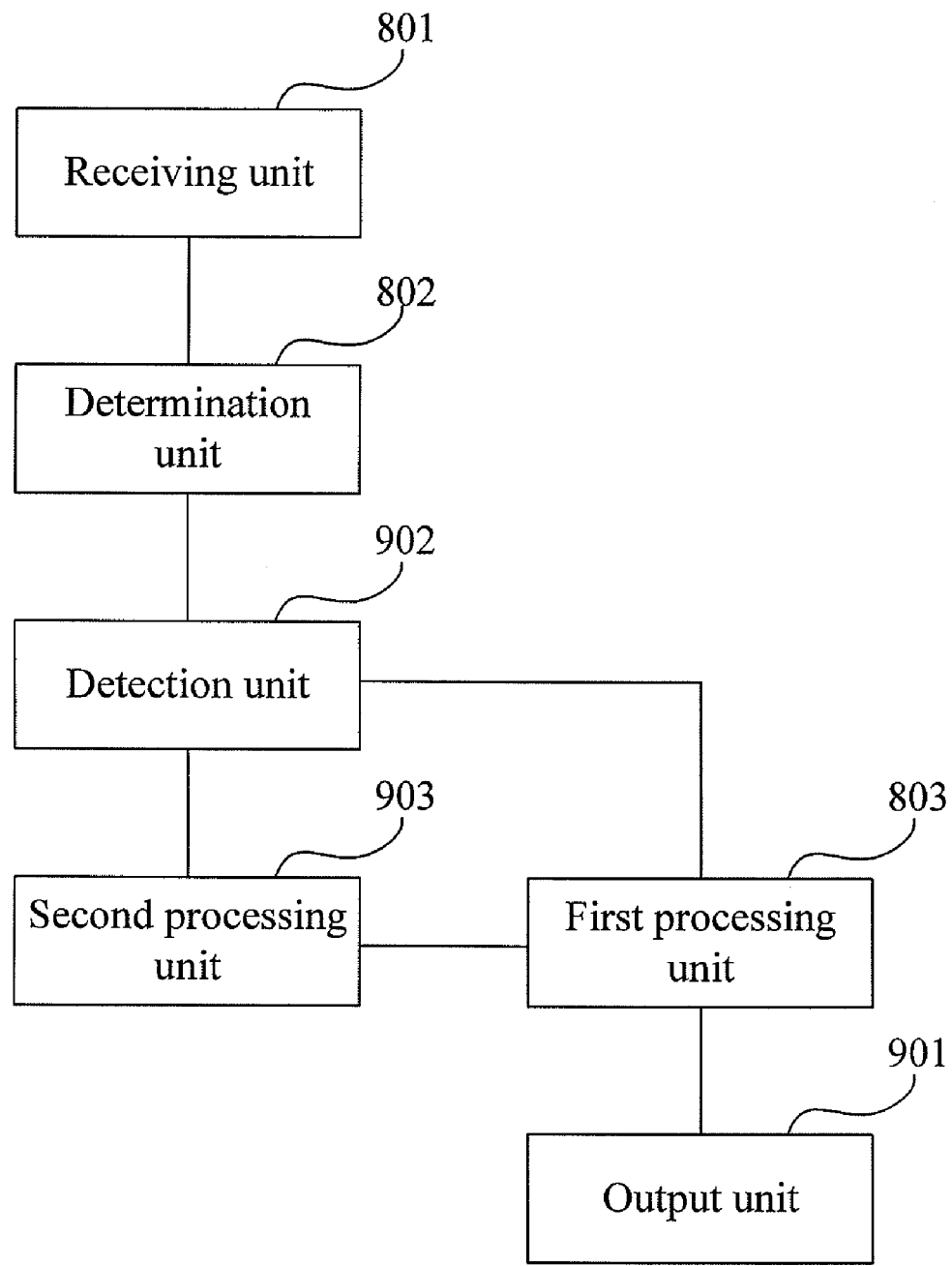
FIG. 9 is a schematic structural view of a transcoding device according to a fifth embodiment of the present disclosure.

In this embodiment, the present disclosure provides a transcoding device. As shown in FIG. 9, the device includes a receiving unit 801, a determination unit 802, and a first processing unit 803, and the functions thereof are similar to those in the fourth embodiment.

In addition, as shown in FIG. 9, the device further includes an output unit 901. The output unit 901 is configured to output the transcoded bit stream.

Before processing the input bit stream, the first processing unit 803 may also detect the input bit stream to detect whether a frame loss occurs to the input bit stream or not. Therefore, the device further includes a detection unit 902 and a second processing unit 903. The detection unit 902 is connected to the determination unit 802 and the first processing unit 803, and is configured to detect whether a frame loss occurs to the input bit stream. If the detection unit 902 detects that no frame loss occurs, the first processing unit 803 transcodes the input bit stream in a corresponding processing manner according to a determination result. If the detection unit 902 detects that a frame loss occurs, the second processing unit 903 processes the input bit stream by using an FEC algorithm.

In addition, the first processing unit 803 is further configured to transcode the input bit stream processed by the second processing unit 903 in a corresponding processing manner according to a determination result.

In this embodiment, the first processing unit 803 may process the input bit stream according to different determination results determined by the determination unit 802. The processing processes are as described in the four situations in the second embodiment, and the details will not be described herein again.

In this embodiment, the process performed by the second processing unit 903 by using the FEC algorithm is as described in the third embodiment, and the details will not be described herein again.

As can be seen from the embodiment, the device can perform a corresponding transcoding operation on the input bit stream according to the attribute of DTX used by the receiving end and the frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech. Moreover, the device is applicable no matter whether the sending end uses DTX or not.

Sixth Embodiment

The embodiment of the present disclosure further provides a communication apparatus. The apparatus includes a transcoding device. The transcoding device may be any one in the fourth embodiment or the fifth embodiment, and the details will not be described herein again.

In this embodiment, the communication apparatus may be a base station, a media gateway, or the like.

As can be seen from the embodiment, the communication apparatus can perform a corresponding transcoding operation on the input bit stream according to the attribute of DTX used by the receiving end and the frame type of the input bit stream. In such a manner, input bit streams of various types can be processed, and the input bit streams can be correspondingly transcoded according to the requirements of the receiving end. Therefore, the average computational complexity and peak computational complexity can be effectively decreased without decreasing the quality of the synthesized speech. Moreover, the communication apparatus is applicable no matter whether the sending end uses DTX or not.

All or part of the steps of the method may be implemented by hardware, such as a processor or processors, instructed by a program. Additionally, part or all of the processes for implementing the method according to the above embodiments may be accomplished by instructing related hardware via a program, and the program may be stored in a computer-readable storage medium, such as Read-Only Memory (ROM), Random Access Memory (RAM), magnetic disc and compact disc.

The objectives and beneficial effects of the present disclosure have been described in further detail through the above specific embodiments. It should be understood that the above descriptions are merely specific embodiments of the present disclosure, but not intended to limit the scope of the present disclosure. Any modification, equivalent replacements, or improvements made without departing from the spirit and principle of the present disclosure should fall within the protection scope of the present disclosure.

The invention claimed is:

1. A transcoding method used between discontinuous transmission (DTX), comprising:
   receiving an input bit stream from a sending end;
   determining an attribute of said DTX used by a receiving end and a frame type of the input bit stream; and
   transcoding the input bit stream in a corresponding processing manner according to a determination result;
   wherein, if the determination result is that the receiving end does not use DTX and the frame type of the input bit stream is a non-speech frame; the transcoding the input bit stream in a corresponding processing manner according to a determination result comprises:
   obtaining parameter information required by the target frame;
   encoding the parameter information required by the target frame by using a parameter encoding algorithm of the receiving end; and
   writing the encoded parameter information required by the target frame into an output bit stream.

2. The method according to claim 1, wherein obtaining parameter information required by the target frame comprises:
   extracting an LSP parameter and an energy parameter contained in the input bit stream by using a DTX decoding algorithm;
   obtaining LSP parameter information and algebraic codebook gain information required by the target frame by transcoding the LSP parameter and the energy parameter; and
   generating a pitch parameter, a codebook gain parameter, and an algebraic codebook parameter required by the target frame.

3. A transcoding method used between discontinuous transmission (DTX), comprising:
   receiving an input bit stream from a sending end;
   determining an attribute of said DTX used by a receiving end and a frame type of the input bit stream; and
   transcoding the input bit stream in a corresponding processing manner according to a determination result;
   wherein, if the determination result is that the receiving end uses DTX and the frame type of the input bit stream is a non-speech frame; the transcoding the input bit stream in a corresponding processing manner according to a determination result comprises:
   transforming the input bit stream into a synthesized speech by decoding the input bit stream;
   determining the target frame type according to the synthesized speech; and transcoding the input bit stream according to the target frame type.

4. The method according to claim 3, wherein, if the target frame type is speech frame; transcoding the input bit stream according to the target frame type comprises:
obtaining parameter information required by the target frame;
encoding the parameter information required by the target frame by using a parameter encoding algorithm of the receiving end; and
writing the encoded parameter information required by the target frame into an output bit stream.

5. The method according to claim 4, wherein, obtaining parameter information required by the target frame comprises:
extracting an LSP parameter and an energy parameter contained in the input bit stream by using a DTX decoding algorithm;
obtaining LSP parameter information and algebraic codebook gain information required by the target frame by transcoding the LSP parameter and the energy parameter; and
generating a pitch parameter, a codebook gain parameter, and an algebraic codebook parameter required by the target frame.

6. The method according to claim 3, wherein, if the target frame is a non-speech frame, transcoding the input bit stream according to the target frame type comprises:
extracting an LSP parameter and an energy parameter contained in the input bit stream by using a DTX decoding algorithm;
obtaining the parameter information required by the target frame by transcoding the LSP parameter and the energy parameter;
encoding the parameter information required by the target frame by using a parameter encoding algorithm of the receiving end; and
writing the encoded the parameter information required by the target frame into an output bit stream.

7. A communications apparatus used between discontinuous transmission (DTX), comprising:
a receiving unit, configured to receive an input bit stream from a sending end;
a determination unit, configured to determine an attribute of DTX used by a receiving end and frame type of the input bit stream;
a first processing unit, configured to transcode the input bit stream in a corresponding processing manner according to a determination result;
a detection unit, connected to the determination unit and the first processing unit, and configured to detect whether a frame loss occurs to the input bit stream; wherein, if the detection unit detects that no frame loss occurs, the first processing unittranscodes the input bit stream in a corresponding processing manner according to a determination result; and
a second processing unit, configured to process the input bit stream by using an frame erasure concealment (FEC) algorithm if the detection unit detects that a frame loss occurs;
wherein the first processing unit is further configured to transcode the input bit stream processed by the second processing unit in a corresponding processing manner according to a determination result.

8. A non-transitory computer readable medium, comprising logic which is used between discontinuous transmission (DTX) and encoded in the computer readable media, the logic when executed operable to:
receiving an input bit stream from a sending end;
determining an attribute of said DTX used by a receiving end and a frame type of the input bit stream; and
transcoding the input bit stream in a corresponding processing manner according to a determination result;
wherein, if the determination result is that the receiving end does not use DTX and the frame type of the input bit stream is a non-speech frame; the transcoding the input bit stream in a corresponding processing manner according to a determination result comprises:
obtaining parameter information required by the target frame,
encoding the parameter information required by the target frame by using a parameter encoding algorithm of the receiving end; and
writing the encoded parameter information required by the target frame into an output bit stream;
wherein, if the determination result is that the receiving end uses DTX and the frame type of the input bit stream is a non-speech frame; the transcoding the input bit stream in a corresponding processing manner according to a determination result comprises:
transforming the input bit stream into a synthesized speech by decoding the input bit stream;
determining the target frame type according to the synthesized speech; and
transcoding the input bit stream according to the target frame type.

* * * * *